March 10, 1970  G. SIEBERS  3,499,690
FLUID BEARING
Filed Jan. 22, 1968

GUNTER SIEBERS
INVENTOR.

BY Karl G. Ross
Attorney

United States Patent Office 3,499,690
Patented Mar. 10, 1970

3,499,690
FLUID BEARING
Gunter Siebers, Nuremberg, Germany, assignor to Ardie-Werk GmbH, Nuremberg, Germany, a corporation of Germany
Filed Jan. 22, 1968, Ser. No. 699,600
Claims priority, application Germany, Jan. 21, 1967,
A 54,685
Int. Cl. F16c 29/02
U.S. Cl. 308—3.5         3 Claims

ABSTRACT OF THE DISCLOSURE

Two complementary tracks, one forming a V-groove and the other forming an acute ridge received in said groove, are detachably secured to a pair of relatively movable machine parts, the V-shaped gap defined therebetween being occupied by elongate nozzles communicating with a source of pressure fluid and surrounded by resilient strips which form an annular space for the return of such fluid to the source.

---

My present invention relates to a fluid bearing to be inserted between two relatively movable machine parts.

In contradistinction to conventional bearings of the ball or roller type, which are readily standardizable and can be attached at the time of assembly to the machine parts to be guided thereby, hydrostatic or other fluid-type bearings known heretofore were generally integral elements of their respective machine parts and could not be readily removed or exchanged.

The general object of this invention is to provide an improved bearing of this character which may be conveniently demounted or replaced so as to avoid the need for repairing or exchanging the entire machine part in the event of damage to its guideway.

This object is realized, pursuant to my invention, by the provision of two complementary track members detachably mounted on respective machine parts so as to extend in the direction of relative motion of these parts with formation of a narrow gap between the two track members, one of these members carrying a set of nozzles which extend close to a confronting surface of the other track member and whose outlets communicate with a source of hydraulic or other high-pressure fluid, the overflow of this fluid being carried off from an annular space formed by a sealing strip which surrounds one or more of these nozzles.

Advantageously, pursuant to a more particular feature of my invention, the two track members are respectively formed with a longitudinal groove and a mating web whereby the gap therebetween is divided into at least two branches each with its own set of nozzles. The gap may have a cross-section in the form of a U or a V, preferably the latter in order that the fluid stream exiting from the nozzles should have a component tending to separate the two members. A vertex angle of approximately 60° has been found highly suitable; larger vertex angles, though sometimes necessary for structural reasons, result in greater variations in gap width upon departures of the relative motion of the parts from exact rectilinearity.

Figure 1:
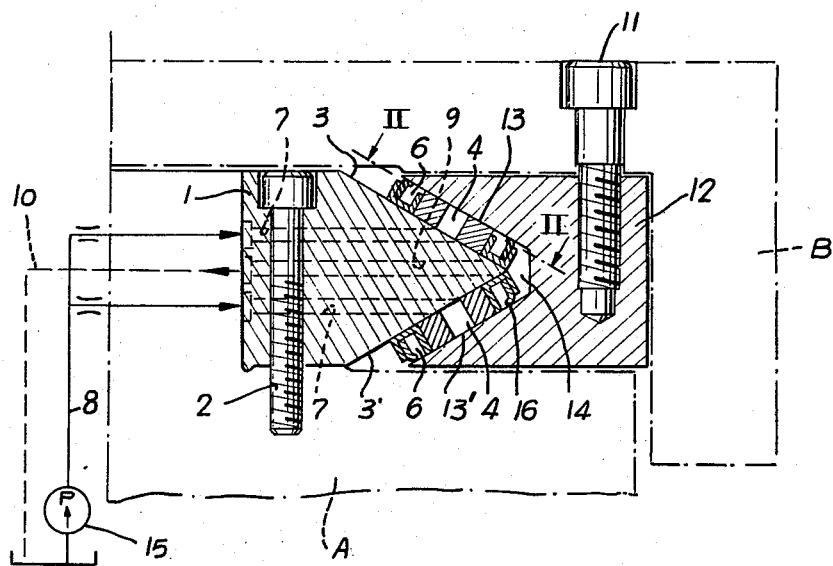
Figure 2:
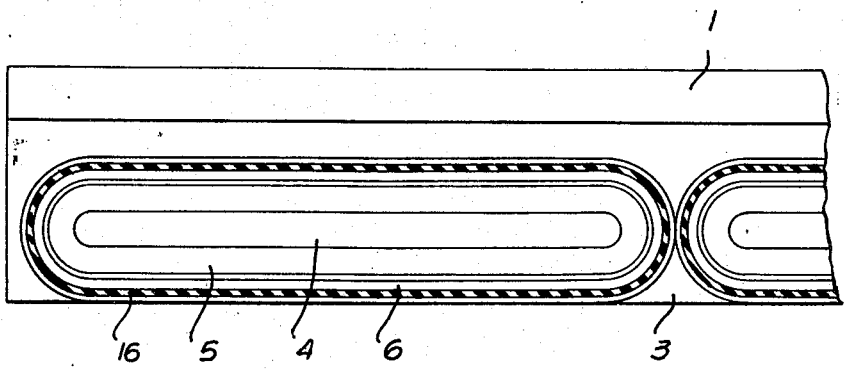

My invention will be described in greater detail hereinafter with reference to the accompanying drawing in which:

FIG. 1 is a cross-sectional view of two machine parts equipped with a hydrostatic bearing according to the invention; and FIG. 2 is a fragmentary view of one of the elements of the assembly of FIG. 1, taken on the line II—II thereof.

In the drawing I have shown two machine parts A and B, part A being for example a fixed base on which the part B, e.g. a carriage, is slidable. Two elongate track members 1 and 12 are detachably secured, with the aid of screws 2 and 11, to the parts A and B and define with each other a narrow V-shaped gap 14.

Track member 1 has a web of wedge-shaped profile with flanks 3, 3′ defining a ridge with an acute angle of approximately 60°; a complementary guideway or V-groove is formed by the sides 13, 13′ of a trapezoidal groove in track member 12.

Each flank 3, 3′ of member 1 has secured thereto, e.g. by cementing, a respective set of elongate nozzles 5 having outlet slots 4 which communicate by way of conduits 7 with a fluid line 8 emanating from the high-pressure side of a hydraulic pump 15. The low-pressure port of this pump is connected through a line 10 and conduits 9 with annular spaces 6 which are formed around the several nozzles 5 by resilient sealing strips 16 with overhanging edges bent inwardly toward the nozzles while bearing upon the confronting surfaces 13, 13′ of member 12. The hydraulic fluid admitted via nozzle outlets 4 into the narrow clearance between the nozzles 5 and the guide surfaces 13, 13′ overflows into the surrounding spaces 6 and is carried off by suction from conduits 9, 10, any escape of this fluid being prevented by the flexible seal formed by the inbent strip edges. This fluid forms a thin film slidably supporting the female track member 12 on its male counterpart 1.

In the event of damage, either track member 1, 12 may be readily removed and replaced.

I claim:
1. In a machine having two relatively movable parts, the combination therewith of a first track member provided with a V-groove along a longitudinal edge; fastening means detachably securing said first track member to one of said parts with its major dimension parallel to the direction of relative motion; a second track member provided along a longitudinal edge with a web of wedge-shaped profile received with clearance in said V-groove; other fastening means removably securing said second track member to the other of said parts with an orientation parallel to said first track member and with formation of a narrow V-shaped gap between confronting flank surfaces of said V-groove and said web, the vertex of the V forming an acute angle and pointing toward said first track member; two sets of nozzles carried on respective flank surfaces of one of said track members on opposite sides of said vertex, each of said nozzles having an outlet closely spaced from the confronting flank surface of the other track member; resilient strip means on said one of said track members surrounding said nozzles and defining therewith annular spaces open toward the confronting flank surfaces of said other track member, said strip means forming overhanging edges bent inwardly toward the surrounded nozzles while bearing upon said confronting flank surfaces of said other track member; first conduit means on said one of said track members terminating at said outlets and communicating with a source of high-pressure fluid; and second conduit means on said one of said track members communicating with said annular spaces for removing said fluid therefrom, the pressure of the fluid in said spaces maintaining said inwardly bent edges in sealing engagement with the flank surfaces contacted thereby.

2. The combination defined in claim 1 wherein the V has a vertex angle of approximately 60°.

3. The combination defined in claim 1 wherein said nozzles are of elongate shape in the direction of relative motion of said parts.

References Cited

UNITED STATES PATENTS

| | | | |
|---|---|---|---|
| 2,182,019 | 12/1939 | Eisele | 308—3.5 |
| 2,869,933 | 1/1959 | Bissinger | 308—5 |
| 3,003,411 | 10/1961 | Judd | 308—5 X |
| 3,030,692 | 4/1962 | Raynes | 308—3.5 |
| 3,231,319 | 1/1966 | Porath | 305—5 |
| 3,231,320 | 1/1966 | Krafft | 308—5 |
| 3,355,990 | 12/1967 | Thum | 308—5 |

FOREIGN PATENTS 1,013,299  12/1965  Great Britain.

MARTIN P. SCHWADRON, Primary Examiner

L. L. JOHNSON, Assistant Examiner

U.S. Cl. X.R.

308—5